United States Patent [19]

Curley

[11] Patent Number: 5,057,930
[45] Date of Patent: Oct. 15, 1991

[54] PLAIN PAPER CARTRIDGE FOR FACSIMILE MACHINE

[75] Inventor: Charles M. Curley, Ithaca, N.Y.

[73] Assignee: Smith Corona Corporation

[21] Appl. No.: 476,994

[22] Filed: Feb. 8, 1990

[51] Int. Cl.$^5$ .................... H04N 1/23; G01D 15/00; B41F 35/00
[52] U.S. Cl. .................... 358/296; 346/136; 346/145; 400/613; 400/701; 400/702
[58] Field of Search .................... 346/136, 139 C, 145; 358/296; 400/249, 613, 701, 702

[56] References Cited

U.S. PATENT DOCUMENTS

| | | | |
|---|---|---|---|
| 3,545,004 | 12/1970 | Alden | 346/136 |
| 3,890,662 | 6/1975 | Alden | 358/145 |
| 4,039,065 | 8/1977 | Seki et al. | 346/76 PH |
| 4,127,858 | 11/1978 | Schiller | 346/136 |
| 4,131,901 | 12/1978 | Alden et al. | 358/145 |
| 4,159,479 | 6/1979 | Alden | 358/145 |
| 4,165,029 | 8/1979 | Mitchell | 400/613 X |
| 4,223,325 | 9/1980 | Ebert | 346/136 |
| 4,234,886 | 11/1980 | Alden | 346/145 X |
| 4,617,577 | 10/1986 | Takahashi et al. | 346/76 PH |
| 4,641,980 | 2/1987 | Matsumoto et al. | 400/613 X |
| 4,652,154 | 3/1987 | Horiya et al. | 400/208 X |
| 4,668,960 | 5/1987 | Okamura | 346/136 X |
| 4,670,795 | 6/1987 | Yamanishi | 358/296 |
| 4,672,465 | 6/1987 | Ono | 358/296 |
| 4,683,478 | 7/1987 | Suzaki et al. | 346/76 PH |
| 4,700,791 | 10/1987 | Iwasaki et al. | 346/136 X |
| 4,708,486 | 11/1987 | Watanabe | 358/296 |
| 4,752,785 | 6/1988 | Isobe | 346/136 |
| 4,758,847 | 7/1988 | Rossopoulos | 346/76 PH |
| 4,764,041 | 8/1988 | Bierhoff | 400/613 X |
| 4,777,533 | 10/1988 | Watanabe | 358/296 |
| 4,779,141 | 10/1988 | Watanabe | 358/296 |
| 4,806,033 | 2/1989 | Ukmar et al. | 400/208 X |
| 4,820,125 | 4/1989 | Keiter et al. | 400/249 |
| 4,914,452 | 4/1990 | Fukawa | 346/76 PH |
| 4,926,358 | 5/1990 | Tani et al. | 355/204 X |

FOREIGN PATENT DOCUMENTS 199279  11/1984  Japan.

Primary Examiner—Benjamin R. Fuller
Assistant Examiner—Eric Frahm

[57] ABSTRACT

A plain paper cartridge for a facsimile machine, the cartridge having an internal supply of plain paper and thermal transfer ribbon, a wiping surface for cleaning the facsimile machine print head upon the insertion and removal of the cartridge from the machine, and an internal paper flow path which reverses the natural curl of the paper to provide generally flat facsimile printouts.

34 Claims, 8 Drawing Sheets

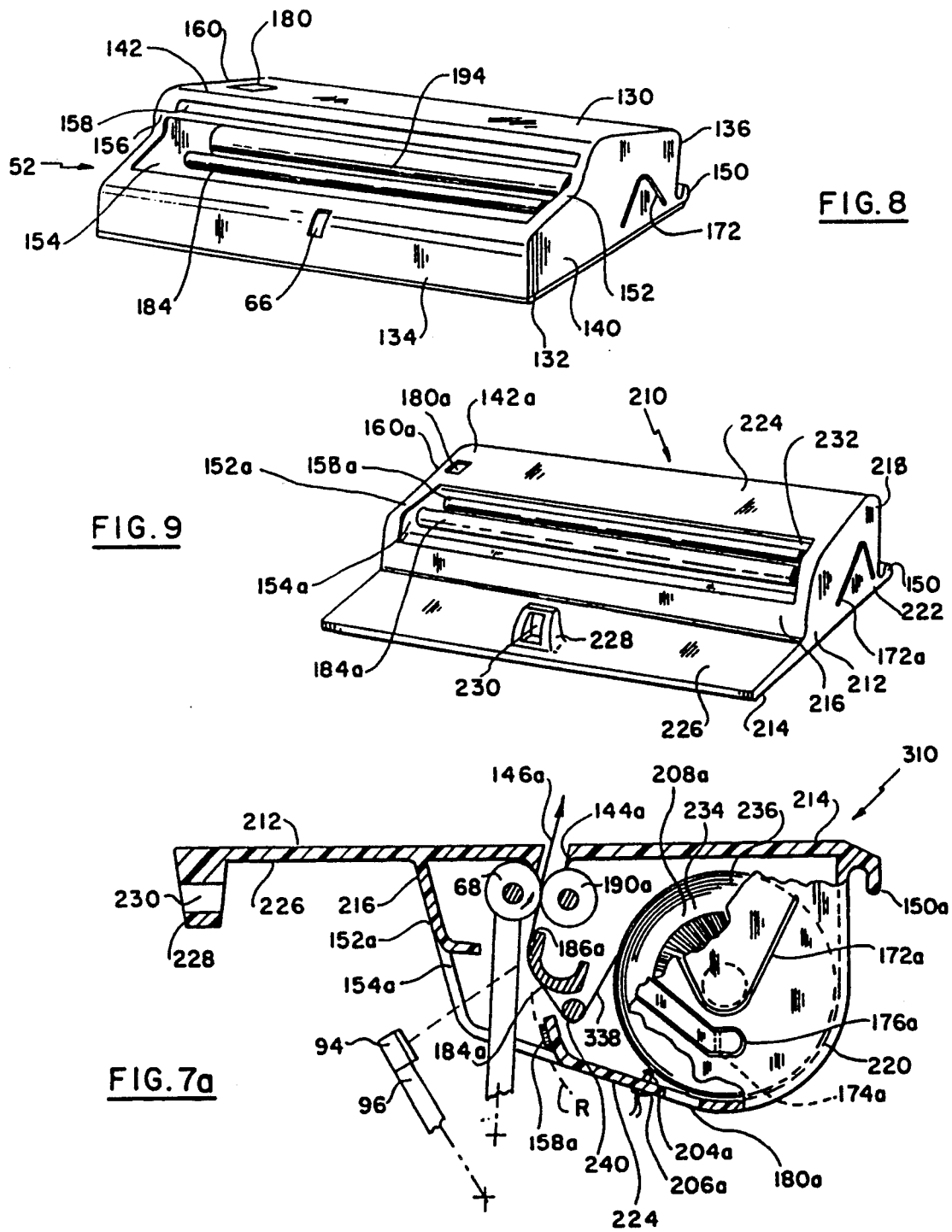

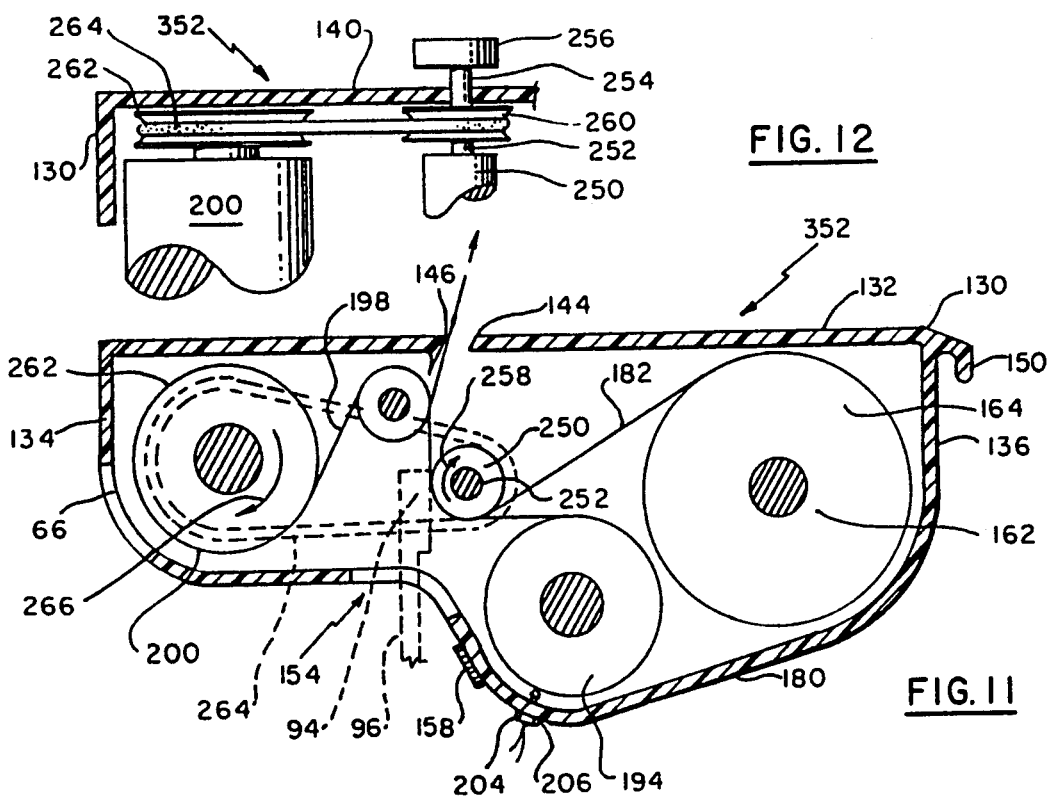
FIG. 12
FIG. 11
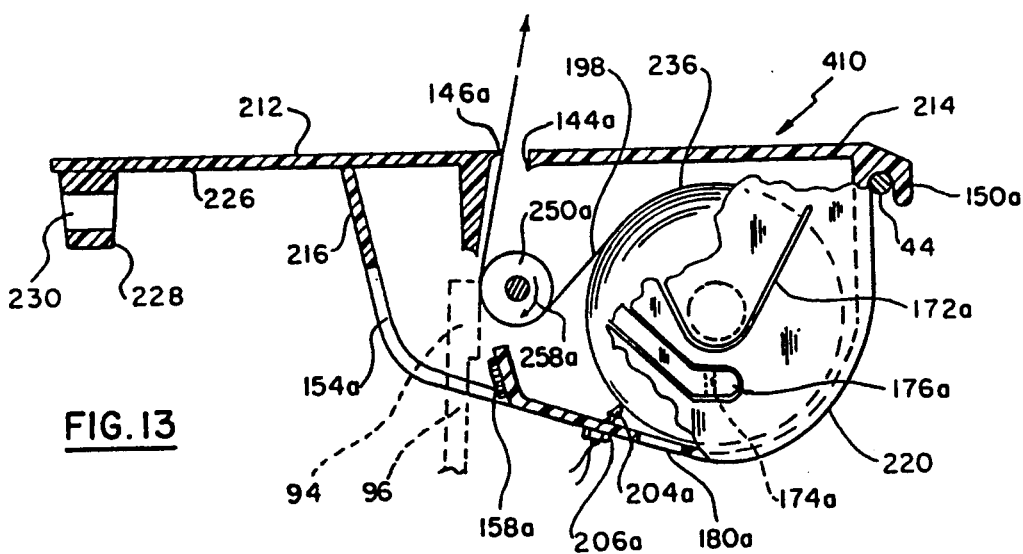
FIG. 13

PLAIN PAPER CARTRIDGE FOR FACSIMILE MACHINE

RELATED APPLICATIONS

The present application is related to commonly-assigned copending applications Ser. No. 07/476,867, filed Feb. 8, 1990, for "Facsimile Cartridge System" and Ser. No. 07/476,998, filed Feb. 8, 1990, for "Thermal Paper Facsimile Cartridge".

BACKGROUND OF THE INVENTION

The present invention relates to facsimile machines, and specifically to a disposable paper supply cartridge for a convertible facsimile machine designed to receive such cartridges providing a variety of types of paper.

A facsimile machine is designed to exchange pictorial images with another remotely located facsimile machine through the use of telephone lines. Each facsimile machine can normally operate either in the role of the "receiver" or "transmitter" of the pictorial image, and contains means for manipulating the image in the form of small picture elements. These picture elements or "pels" are tiny gray or white "windows" whose size ranges from 3 to 5 mils square.

Each facsimile machine possesses five (5) essential elements which are required in the image transfer process:

1) a scanner which reads the white, black or gray color information of each pel from the image of each original document;

2) a modem which controls the transmission of pel data over the telephone lines;

3) a printer which reconstructs the image when in the receiving role or mode by printing on paper the black or gray data at each of the pel locations;

4) a keyboard which allows the facsimile operator to set the modes of operation and to program the telephone numbers of remote receiving facsimile machines; and 5) a central controller, usually a microcontroller, whose purpose is to control the interaction between these elements.

Certain commercially available facsimile machines require that the normal office or home telephone be interconnected to the machine base for the purpose of handling the telephone calls transmitting pel data. However, the majority of machines contain built-in telephones and can be used merely as telephones. In addition, most facsimile units have the ability to reproduce images locally. A "COPY" mode allows an original document to be copied locally, much like an office copier. These machines thus have triple functions, and are often referred to as "FAX/PHONE/COPIERS" in advertising.

The printer elements of conventional facsimile machines are provided for use either with paper having a thermally activated transfer coating (hereinafter referred to as "thermal paper") or with so-called plain paper. A disadvantage of thermal paper is that facsimile messages printed thereon often become curled upon their ejection from the machine, causing difficulty in archiving these messages. Thus, a standard operating procedure in many offices is to make a plain paper copy of every thermal paper facsimile for archival purposes. Another disadvantage of thermal paper is that it often turns yellow in as little as a few days after the message is printed by the machine. Also, it is often difficult to write on thermal paper with a ball-point pen.

In order to address these and any other disadvantages of thermal paper, facsimile machines have been designed for use with plain paper. Such machines use electrophotographic, xerographic, or thermal transfer technology to produce the facsimile image, and as a result, are significantly more expensive than thermal paper machines. Thus, a prospective facsimile machine purchaser must choose between thermal paper machines, with their lower cost and somewhat less desirable paper, and the more expensive plain paper machines. This is truly a dilemma for an economically constrained buyer.

In both types of conventional machines, the paper is provided rolled on a spool, and must be carefully threaded through the machine by hand. In busy offices, it is not uncommon for message transmission to be disrupted during the changing of the paper.

A further disadvantage of conventional facsimile machines, regardless of the type of paper used, is that, through use, the print head becomes soiled. This results in unwanted lines being printed on the facsimile message and/or in blurred or otherwise illegible type. Printing head cleaning kits are now being made available; however, they are time consuming to use.

Facsimile machines which may accept both thermal and plain paper are now available, but the buyer must pay the cost penalty for a "plain paper" unit at the point of purchase of the machine. Thus, there is a need for a facsimile unit which is available at "thermal" costs, and which can later be made "upgradable by the user" to accept plain paper. In this way, the "choice of paper" dilemma is removed from the buying decision at point of purchase of the machine. There is also a need for a more convenient system for changing facsimile paper, and for cleaning soiled facsimile print heads. In addition, there is a need for a more convenient way to package, store, and dispose of facsimile paper and ribbon supplies. Lastly, there is also a need in more economically constrained environments, such as home offices, to have facsimile papers that are adaptable to the immediate task. For instance, the more economical thermal paper is appropriate for the normal facsimile receiving mode. However, when an important document such as a contract or a drawing is expected to be received, it would be beneficial to have the capability of receiving the document, and/or copying it, on plain paper. It is apparent that a convenient method is needed to adapt the machine to a specified type of paper quickly and conveniently.

SUMMARY OF THE INVENTION

Accordingly, the present invention provides a plain paper cartridge for a facsimile machine which is convertible by accepting cartridges having either plain paper or thermal paper. In addition, the cartridge may be provided with a wiping surface for cleaning the machine print head upon the insertion of the cartridge into the machine, and the removal of the cartridge therefrom.

More specifically, the plain paper supply cartridge of the invention is configured for use in a facsimile machine having a housing with a recess and a print head projectable into the recess. The paper supply cartridge has a cartridge housing configured for insertion into the recess of the machine and an access opening for accommodating the print head for operational engagement in the cartridge. The cartridge of the invention is also provided with a plain paper supply roll located within the cartridge housing, and a thermal transfer ribbon supply roll. The paper and transfer ribbons operationally engage the print head for the transferral of the facsimile message.

BRIEF DESCRIPTION OF THE DRAWINGS

FIG. 2a is a diagrammatic fragmentary sectional view taken along the line a—a of FIG. 2, and in the direction generally indicated;

FIG. 7a is a diagrammatic side elevational view of an alternate embodiment of the thermal paper cartridge of FIG. 7, with portions broken away for clarity;

FIG. 8 is a diagrammatic bottom perspective elevational view of the plain paper cartridge of FIG. 4;

FIG. 9 is a diagrammatic bottom perspective elevational view of the thermal paper cartridge of FIG. 6;

FIG. 11 is a diagrammatic vertical sectional view of an alternate embodiment of the plain paper cartridge of FIG. 5;

FIG. 12 is a fragmentary diagrammatic plan view of the plain paper cartridge of FIG. 11; and FIG. 13 is a diagrammatic side elevational view of an alternate embodiment of the thermal paper cartridge of FIG. 7, with portions broken away for clarity.

DESCRIPTION OF THE PREFERRED EMBODIMENT

Figure 1:
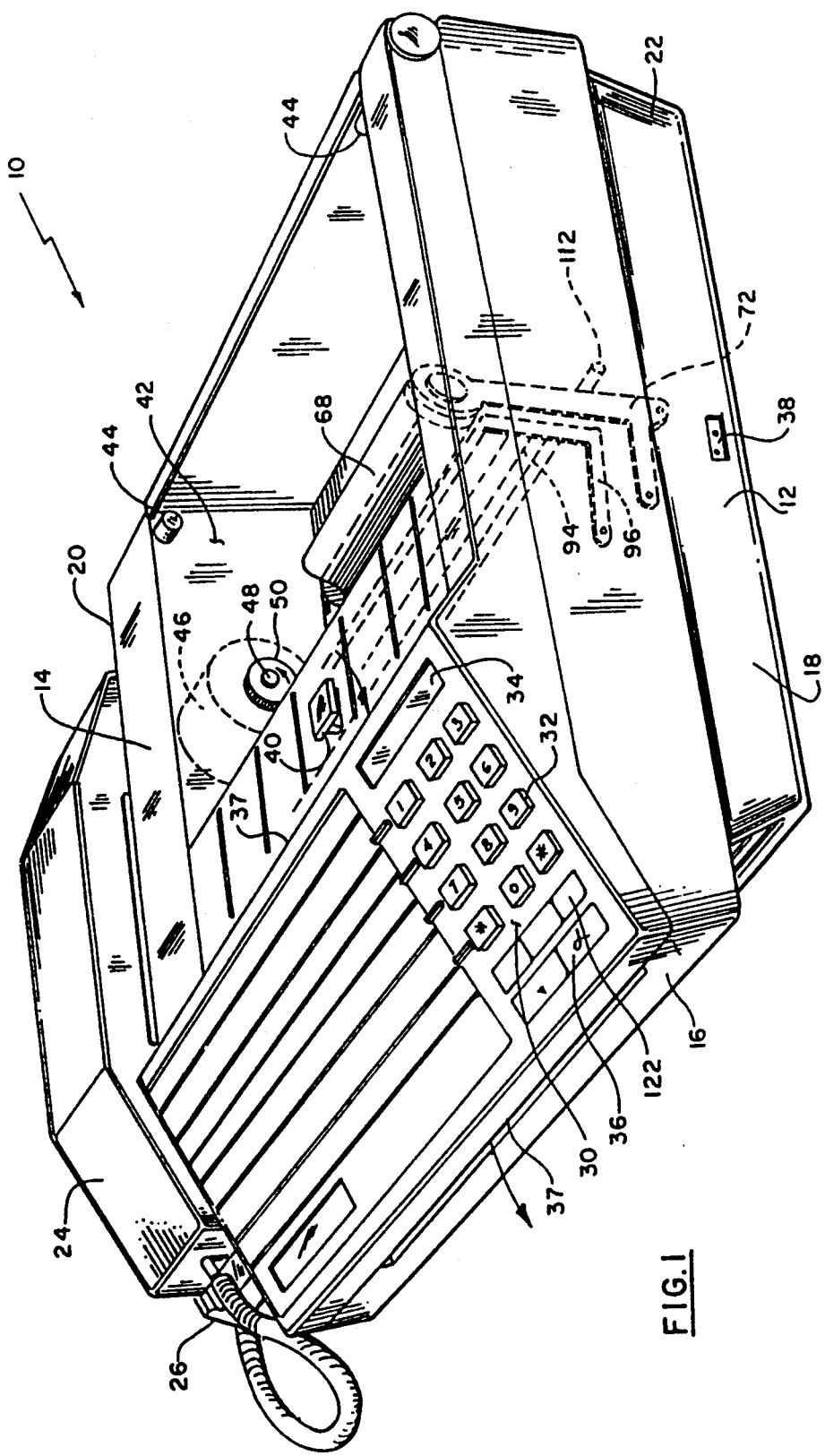
FIG. 1 is a diagrammatic top perspective elevational view of the facsimile machine designed to be used with the cartridge embodying the invention, the paper cartridge not shown.

Referring now to the drawings, and particularly to FIG. 1, a facsimile machine configured for use with the cartridge of the invention is generally indicated at 10. The machine 10 has a housing 12 with a top or upper end 14, a front end 16, first and second sides 18 and 20, respectively, and a rear end 22. A telephone receiver 24 may be mounted to the housing 12 in a cradle 26 located at the second side 20. The top 14 includes a forwardly inclined control panel 30 provided with a dialing keypad 32, a telephone number display 34 as well as other controls 36. An elongate slot 37 is located at the front end 16 and behind the control panel 30 for the insertion and ejection of documents when facsimile transmissions are to be sent. A power and/or telephone line input 38 is shown located in the first side 18; however, the input 38 or additional inputs may be provided elsewhere on the housing 12.

The top 14 also includes a cartridge latch release button 40 and a cartridge recess 42. The recess 42 includes a pair of inwardly projecting, generally coaxially disposed pivot lugs 44 near the upper margin of the rear end 22. A drive motor 46 (shown hidden) having a drive shaft 48 is positioned within the housing 12 so that the drive shaft 48 and a pinion gear 50 secured thereto project into the recess 42.

Figure 2:
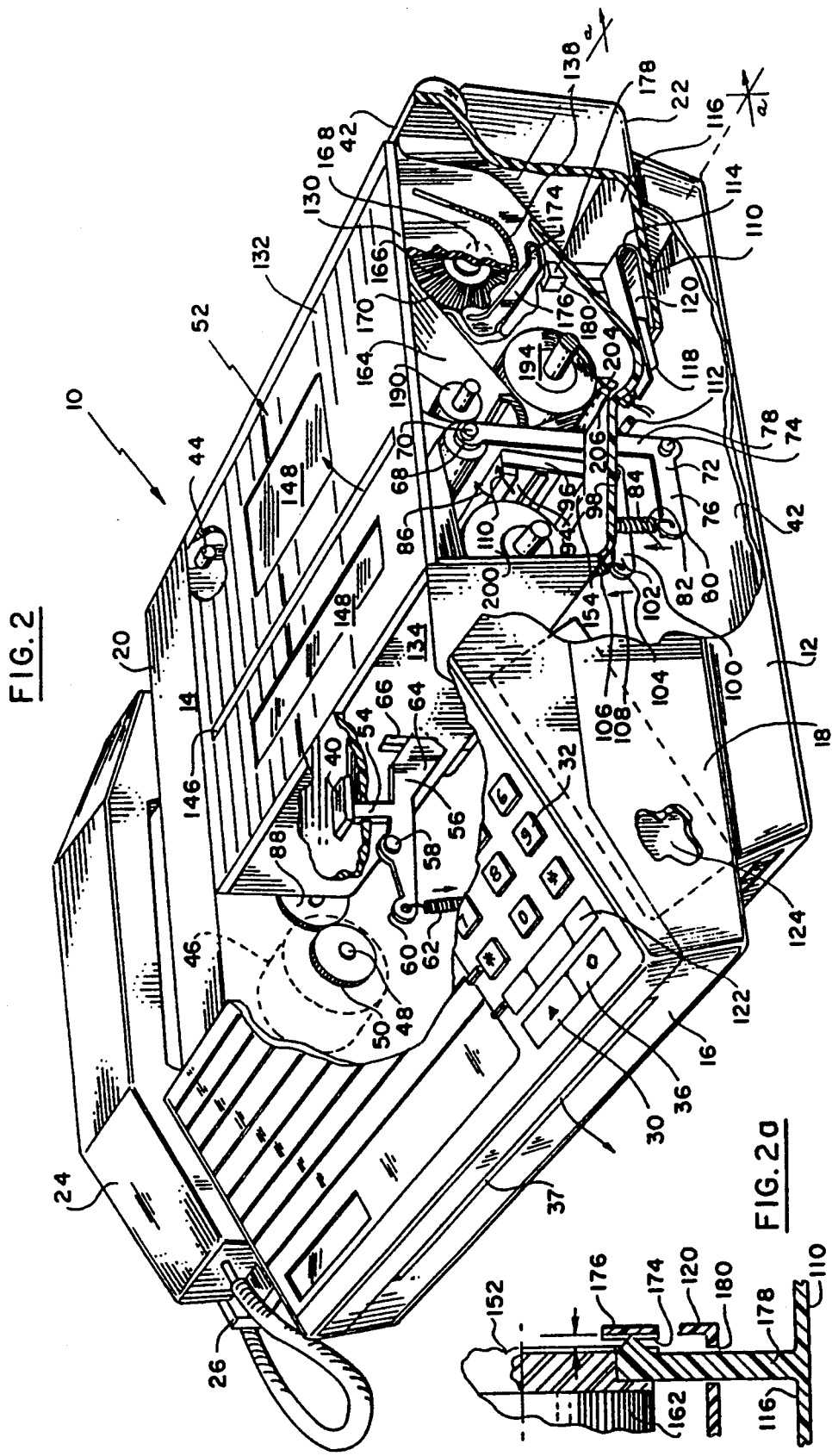
FIG. 2 is a diagrammatic top perspective elevational view of the facsimile machine of FIG. 1, with a plain paper cartridge installed and with portions broken away for clarity.

Referring now to FIG. 2, the machine 10 is depicted with a disposable paper cartridge 52 located in the recess 42. Also, the latch release button 40 is secured to an upright portion 54 of a latch lever 56 which is mounted within the housing 12 to pivot about a pin 58 secured to the housing 12. The lever 56 is biased at a first end 60 by a compression spring 62, the spring being secured at one end to the housing 12. A second end 64 of the lever 56 engages a vertical slot 66 in the cartridge 52 to retain the cartridge within the recess 42.

The machine 10 also includes a paper drive roll 68 having a core shaft 70 which is secured at each end to one of a pair of pivot arms 72 (only one of which is shown in FIG. 2) which each pivot about a corresponding pin 74 secured to the housing 12. The pivot arms 72 are basically "L"-shaped, with a leg 76 projecting perpendicularly from a vertical portion 78 of the arm 72, the leg having an eyelet 80 designed to accommodate an end of a compression spring 82. The spring 82 is secured at an opposite end to the housing 12 and pulls the leg 76 in an upward direction indicated by an arrow 84 so as to bias the arm 72 in a direction indicated by an arrow 86. The paper drive roll 68 is axially rotated by the motor 46 through the pinion 50 and a gear drive system diagrammatically represented by a drive gear 88. The direction of rotation of the drive roll 68 is indicated by an arrow 90 (best seen in FIG. 5), or counterclockwise as seen from the side 18. In order to be engaged by the gear 88, the core shaft 70 is provided with a pinion 92 (best seen in FIG. 10).

An elongate line type or serial thermal print head 94 is secured at each end to a respective pivot arm 96, the arm being configured for pivoting action about a pin 98 which is secured to the housing 12. The arm 96 includes a leg 100 having an end 102 which is provided with an eyelet 104 designed to accommodate one end of a compression spring 106. The spring 106 is secured at an opposite end to the housing 12. In a similar fashion to the biased nature of the paper drive roll 68, the spring 106 pulls the leg 100 in an upward direction indicated by an arrow 108 so that the print head 94 is biased in a direction indicated by an arrow 110. The arm 72 and the arm 96 are biased against a stop rod 112 secured within the cartridge housing 12. The biasing force is respectively provided by the spring 82 and the spring 106. The stop rod 112 locates the arm 72 and the arm 96 in a desired position when the cartridge 52 is not seated in the recess 42. A leaf spring 114 is located on a floor 116 within the recess 42 and is depressed upon the installation of the cartridge 52 in the recess. Once the cartridge 52 is removed, the absence of weight on the spring 114 allows the spring 114 to disengage a switch contact 118 from one leg 120 of the spring 114 to energize a warning light 122 on the control panel 30 (best seen in FIGS. 1 and 2). The warning light 122 may also be illuminated when the cartridge 52 is not correctly seated in the recess 42.

Figure 3:
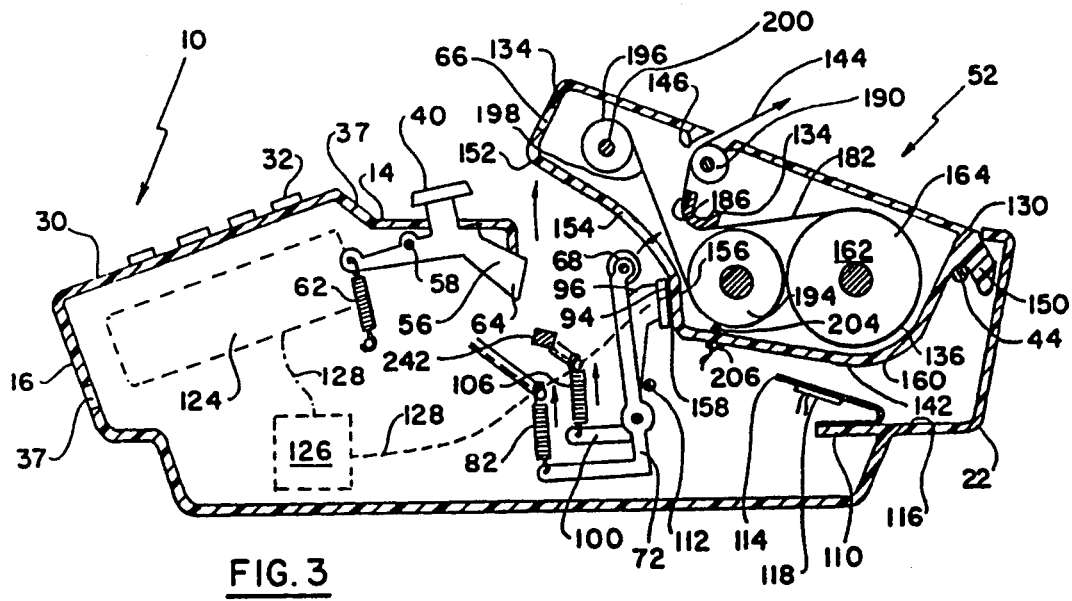
FIG. 3 is a diagrammatic vertical sectional view of the facsimile machine of FIG. 2 showing the insertion/removal of a plain paper cartridge.
Figure 3A:
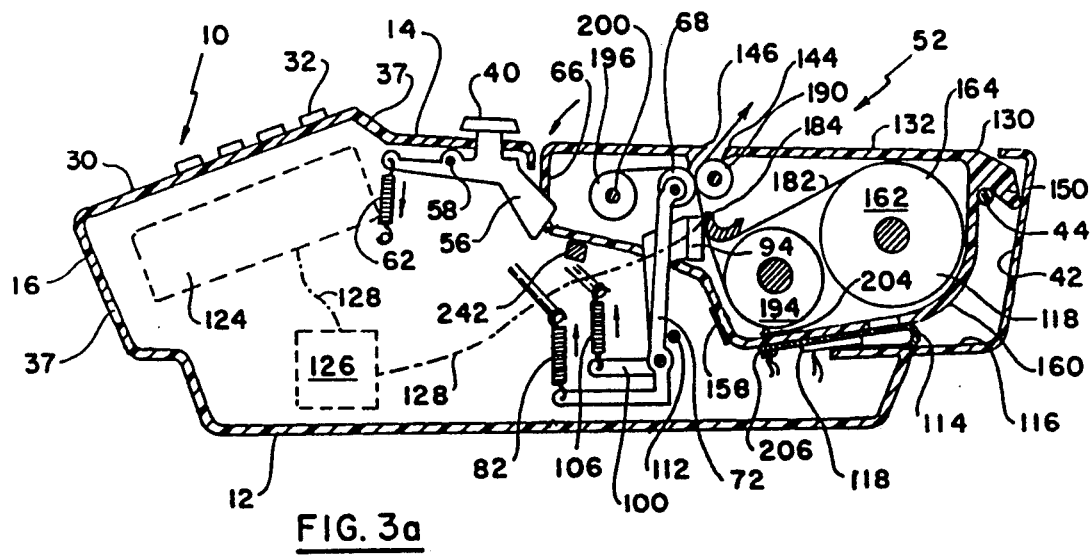
FIG. 3a is a diagrammatic vertical sectional view of the facsimile machine of FIG. 3 showing the plain paper cartridge locked into the machine.
Figure 4:
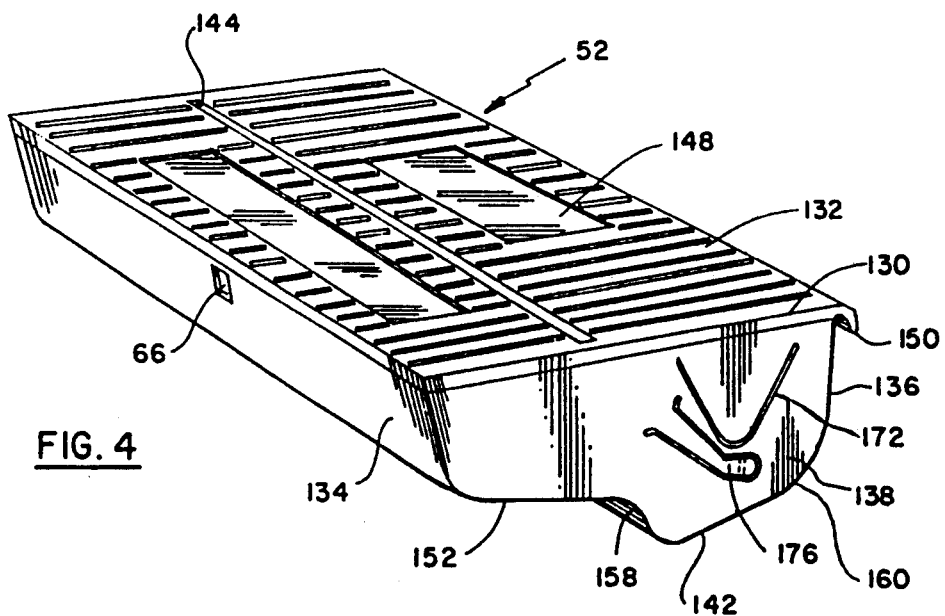
FIG. 4 is a diagrammatic top perspective elevational view of the plain paper cartridge depicted in FIG. 2.

The machine 10 also includes a conventional scanner section 124 which is shown hidden in block form behind the control panel 30. The scanner 124 is used for sending facsimile messages of documents passed through the slot 37. In the preferred embodiment, the machine 10 is provided with a scanner/print head interface circuit generally designated 126 (best seen in FIGS. 3 and 3a) which is connected between the scanner 124 and the print head 94 by means of leads 128. The circuit 126 permits the operator to copy recently received facsimile messages or other documents by passing them through the slot 37. The operation of the circuit 126 is actuated by the control panel 30.

Referring now to FIGS. 2-5, 8 and 10, the paper cartridge 52 is actually specially configured to hold plain paper, and as such will be subsequently referred to herein as the plain paper cartridge 52. The cartridge 52 includes a housing 130 configured for releasable disposition within the recess 42 and having a top 132, a front end 134, a rear end 136, a pair of sides 138 and 140, respectively, and a bottom 142. The top 132 includes a transverse paper outlet slot 144 through which a facsimile message is automatically ejected during the message reception and transcription process. Preferably, a leading edge 146 (best seen in FIG. 5) of the slot 144 is sharpened to enable the operator to tear off the completed message. Also, at least one observation window 148 may be provided through which the operator may view the amount of unused paper and/or ribbon in the cartridge 52 to determine the appropriate time for cartridge replacement.

The slot 66 which accommodates the end 64 of the cartridge latch lever 56 is located in the generally vertically projecting front end 134. The rear end 136 includes an integral hook formation 150 near the top 132 which is configured to engage the pivot lugs 44 of the recess 42 to properly position the cartridge 52 within the recess 42.

A front portion 152 of the cartridge bottom 142 includes a transverse, generally rectangular access opening 154 through which the paper drive roll 68 and the print head 94 pass to engage respective components of the cartridge 52. A centrally located, upwardly angled portion 156 of the bottom 142 is located adjacent the rear of the access opening 154 and provides a mounting surface for a print head wiping strip 158. The wiping strip 158 may be made of foam or gauze-like material, is preferably co-dimensional with the print head 94, and may optionally be impregnated with a cleaning solvent. A rear portion 160 of the cartridge bottom 142 is shown to be upwardly inclined toward the rear end 136; however, this configuration is not critical, being determined mainly by the shape of the internal components of the cartridge 52.

Figure 10:
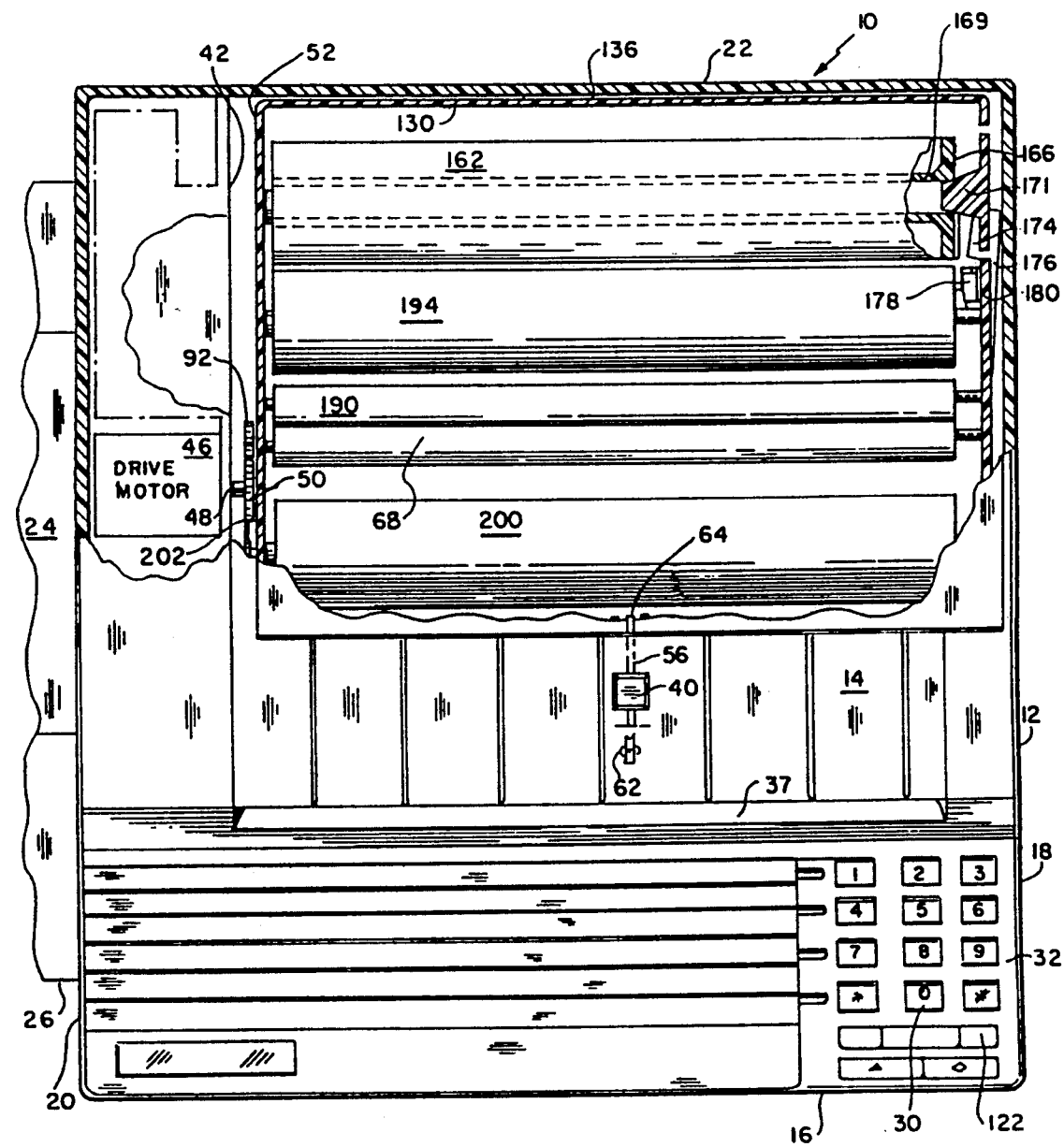
FIG. 10 is a diagrammatic plan elevational view of the facsimile machine embodying the invention, having a plain paper cartridge mounted therein, and with portions broken away for clarity.

Internally, the cartridge 52 includes a paper supply roll 162 with a supply of plain paper 164 thereon. The ends 166 of the supply roll 162 each include a stub shaft 168 and a plurality of radial notches 170. The stub shafts 168 are each rotatably seated within an inwardly projecting, generally "V"-shaped formation 172 in each side 138, 140 of the cartridge 52. Referring now to FIG. 10, the supply roll 162 may alternately be provided with a hollow core 166 into which are inserted inwardly projecting stub shafts 171 located on each side 138, 140 to allow the roll 162 free rotation.

Figure 5:
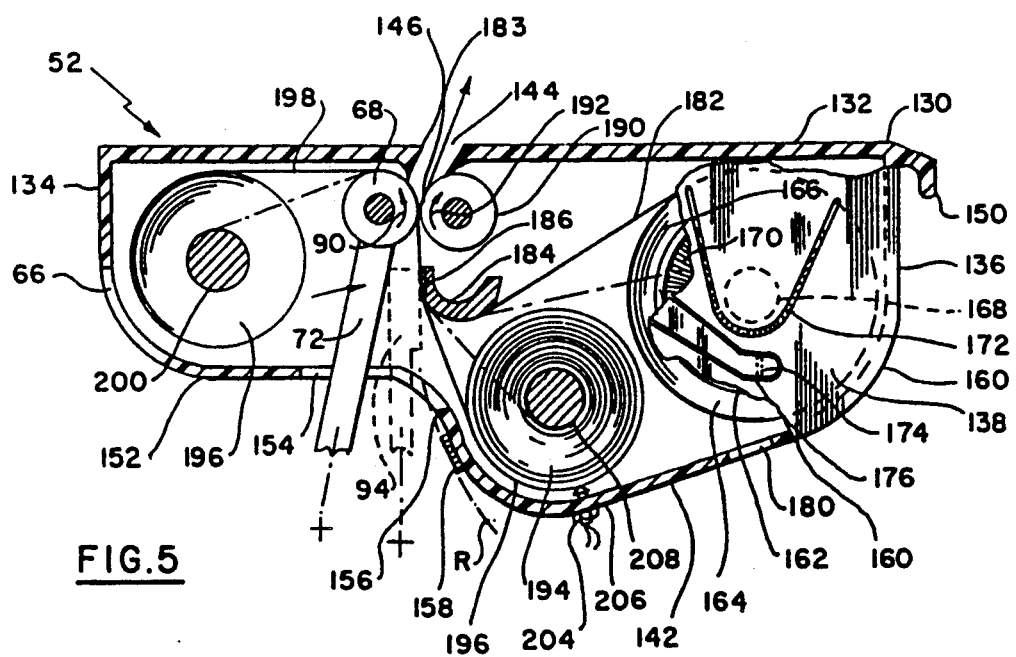
FIG. 5 is a diagrammatic side elevational view of the plain paper cartridge of FIG. 4, with portions broken away for clarity.

Referring now to FIGS. 2, 2a and 5, an inwardly projecting finger 174 (best seen in FIG. 2a) is located on an arm 176 which is integral with, and is actually a partially cut out portion of the cartridge side 138. The finger 174 engages one of the notches 170 to prevent the supply roll 162 from rotating during shipping and storage. The arm 176 is configured so that upon installation of the cartridge 52 within the machine 10, the finger 174 is cammed away from the notches 170 by a cam 178, and permits free rotation of the supply roll 162. The cam 178 integrally projects upward from the floor 116 and passes through a rectangular opening 180 formed in the bottom 142 of the cartridge 52.

A web 182 of the paper 164 is drawn from the supply roll 162 and is looped or passed around a curved paper guide 184. The paper guide 184 is secured within the cartridge housing 130 and includes a metallic print platen 186 on a forward edge thereof (best seen in FIG. 5). The platen 186 is at least as long as the width of the paper 164. The web 182 is then passed between a nip 188 formed at the point of contact between the paper drive roll 68 and a paper feed roll 190. The feed roll 190 is mounted within the housing 130 for free axial rotation. The spring 82 exerts a biasing force against the pivot arm 72 to press the drive roll 68 against the paper feed roll 190. The feed roll 190 is thus driven by the drive roll 68 in a direction indicated by an arrow 192 which is opposite to the rotational direction 90 of the roll 68, or clockwise as seen from the side 138. The paper web 182 passes between the rolls 68, 190 and ultimately through the slot 144.

It is common for plain or thermal facsimile paper to develop a "curl" when retained upon a roll for any length of time. Consequently, a portion of facsimile paper carrying the facsimile transmission also often exhibits some degree of curl, which makes such messages difficult to handle and neatly archive. To this end, in the present plain paper cartridge 52, the plain paper roll 162 is located in the cartridge so that the web 182 from the roll 162 acquires a reverse curl. This is accomplished by drawing the web 182 from the roll 162 and feeding it through the cartridge 52, i.e., around the paper guide 184 and the feed roll 190 to reverse the natural curl of the paper on the roll 162. Thus, through the paper path of the present cartridge 52, the paper 164 containing the facsimile message is provided in a relatively flat or uncurled condition as it is ejected from the slot 144.

The plain paper cartridge 52 is also provided with a thermal ribbon supply roll 194 having a supply of ribbon 196 thereon. The ribbon supply roll 194 is mounted within the cartridge housing 130 for relatively free axial rotation. A web 198 of the ribbon 196 is placed between the print head 94 and the web 182 of the paper 164, and the ribbon and paper are then pressed against the platen 186 by the print head 94 so that the facsimile image may be reproduced. The web 198 of the ribbon 196 and the web 182 of the paper 164 are then simultaneously fed in back-to-back fashion through the nip 188. The ribbon 196 is subsequently passed over the drive roll 68 and is taken up by a ribbon take-up spool 200. The ribbon take-up spool 200 is preferably driven by the motor 46 through a gear drive represented by the gear 202 (best seen in FIG. 10). An end-of-ribbon sensor 204 may be located near the floor 116 of the recess 42 and is configured to project through an opening 206 in the bottom 142 of the cartridge 52 so as to electronically detect and indicate when the ribbon 196 needs replacement. The sensor 204 may be triggered by a reflective trailer 208 (best seen in FIG. 5) on the ribbon 196, and is preferably wired to the control panel 30 to provide a visual indication of the condition of the ribbon 196.

Figure 6:
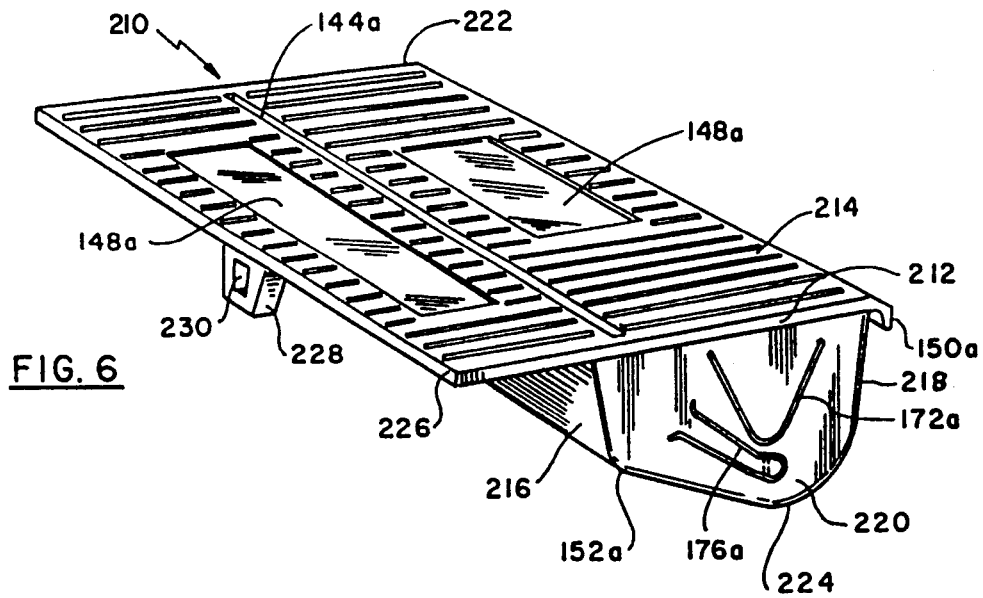
FIG. 6 is a diagrammatic top perspective elevational view of a thermal paper cartridge of the type employed in the machine of FIG. 1.
Figure 7:
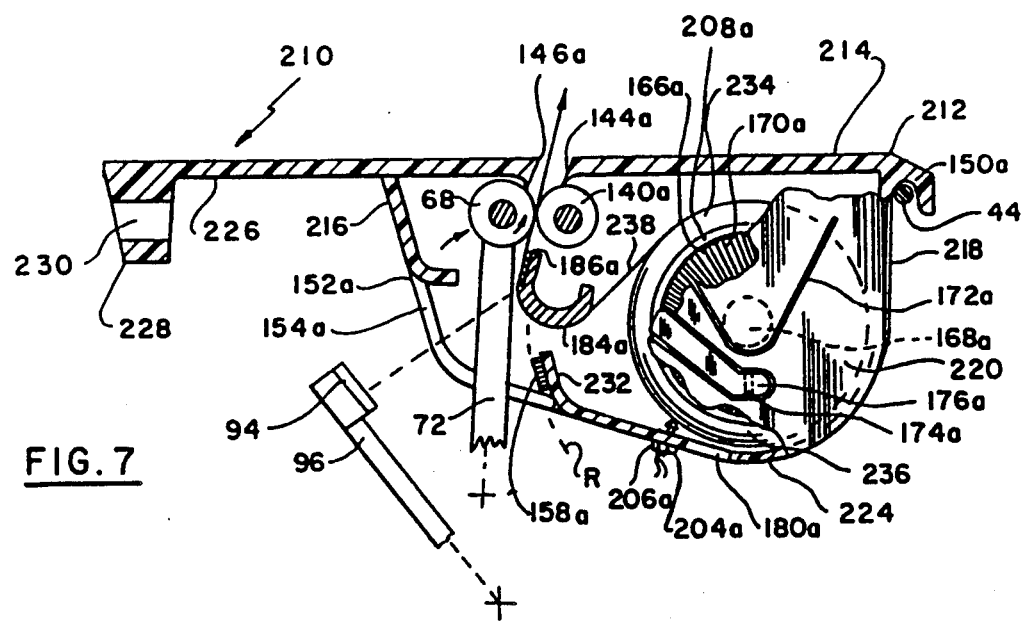
FIG. 7 is a diagrammatic side elevational view of the thermal paper cartridge of FIG. 6, with portions broken away for clarity.

Referring now to FIGS. 6, 7 and 9, a disposable thermal paper cartridge is depicted, designated generally by the reference numeral 210. Those components of the thermal paper cartridge 210 which are similar to corresponding components in the plain paper cartridge 52 will be designated by the same reference numeral, accompanied by the subscript "a". The thermal paper cartridge 210 includes a housing 212 configured for releasable disposition within the recess 42, and having a top 214, a front end 216, a rear end 218, a pair of sides 220, 222, respectively, and a bottom 224. In that the housing 212 is generally shorter front-to-back than is the plain paper cartridge 52, the top 214 includes a forwardly projecting flange 226 which covers the remainder of the recess 42 not otherwise taken up by the cartridge housing 212. In similar fashion to the plain paper cartridge 52, the top 214 includes a transverse paper outlet slot 144a through which a facsimile message is automatically ejected during the message reception and transcription process. Preferably, a leading edge 146a of the slot 144a is sharpened to enable the operator to tear off the completed message. The cartridge 210 may also include at least one observation window 148a and an integral hook formation 150a at the top of the rear end 218. In order to releasably lock the cartridge 210 in the recess 42, the latch lever 56 (best seen in FIG. 3), engages a formation 228 located on the underside of the flange 226 and having a slot 230. The slot 230 is configured to accept the insertion of the latch member end 64.

A front portion 152a of the cartridge bottom 224 includes a transverse opening 154a through which the drive roll 68 and the print head 94 pass to engage respective components of the cartridge 210. An upwardly angled portion 232 of the bottom 224 serves as a mounting point for a print head wiping strip 158a.

Internally, the cartridge 210 includes a thermal paper supply roll 234 having a supply of thermal paper 236 rolled thereon. The ends 166a of the thermal paper supply roll 234 each include a stub shaft 168a and a plurality of radial notches 170a. The stub shafts 168a are each seated within an inwardly projecting, generally "V"-shaped formation 172a located in each of the sides 220, 222 to allow the roll 234 to rotate freely therein. A finger 174a is located on an arm 176a which is integral with, and partially cut-out from the side 220. The finger 174a projects inwardly to engage the notches 170a in similar fashion to the camming arrangement in the plain paper cartridge 52.

Referring now to FIG. 7, a web 238 of thermal paper 236 is drawn from the supply roll 234 and is passed around a curved paper guide 184a which is secured within the housing 212 and includes a metallic print platen 186a. The platen 186a is disposed on the guide 184a so as to receive the print head 94 as it passes through the access opening 154a. A paper feed roll 190a provides a contact surface for the spring-biased drive roll 68. The paper feed roll 190a is driven by contact with the drive roll 68 in similar fashion to the drive roll 190, and the thermal paper web 238 is passed between the drive roll 68 and the paper feed roll 190a and ultimately through the slot 144a. It will be appreciated that, as in the case of the plain paper cartridge 52, the paper feed path of the cartridge 210 is also designed to reverse the curl of the paper 236. The end-of-ribbon (paper) sensor 204a may be designed to alternately project through an opening 206a so as to detect when the thermal paper roll 234 is spent, and may be used with a reflective trailer 208a in the same manner as described previously in relation to the plain paper cartridge 52.

In both the cartridge 52 and the cartridge 210, the print head wiping strip 158, 158a is disposed so as to travel a specified radius "R" (best seen in FIGS. 5 and 7) measured from the pivot lugs 44. In this manner, the wiping strip 158 will wipingly engage the print head 94 each time the cartridge 52/210 is installed or removed from the machine 10 (wiping action best seen in FIG. 3).

Referring now to FIG. 7a, an alternate embodiment for the cartridge 210 is shown, being generally designated 310. The cartridge 310 differs from the preferred embodiment only by having a small diameter idler roller 240 which is positioned within the housing 212 between the roll 234 and the paper guide 184a in order to reduce friction on the guide.

Referring now to FIGS. 11 and 12, an alternate embodiment to the plain paper cartridge 52 is shown and is designated generally as 352. The cartridge 352 includes many of the features of the cartridge 52, those features being designated with the same reference characters as in cartridge 52. The cartridge 352 differs from the cartridge 52 in that the fixed paper guide 184 and the print platen 186 are replaced by a rotating platen 250. The rotating platen 250 is generally cylindrical and is at least as long as the width of the ribbon 196 and the plain paper 164, and is rotatably secured within the housing 130. The platen 250 includes an axial shaft 252, the shaft 252 having an end 254 which projects from the side 140 of the housing 130. A pinion gear 256 is secured to the projecting end 254 of the shaft 252 and is configured to mesh with the gear drive 50, 88 so as to be driven by the motor 46 in a clockwise direction indicated by an arrow 258.

The shaft end 254 also includes a grooved pulley 260 which is fixed to the shaft 252 on the inside of the housing 130. A second grooved pulley 262 is fixed to the ribbon take-up spool 200 so as to be aligned with the pulley 260. A garter spring 264 is seated in pulleys 260 and 262 for rotating the spool 200 clockwise as indicated by an arrow 266 (best seen in FIG. 11) for taking up the spent web 198. The direction of rotation of the spool 200 is indicated by an arrow 266. As was the case with the preferred embodiment, the print head 94 projects through the access opening 154 to engage the platen 250. The print head 94 presses the web of thermal ribbon 198 against the web of plain paper 182, which directly contacts the rotating platen 250. The paper 164 and the ribbon 196 are advanced simultaneously by the rotation of the platen 250. It will be appreciated from the embodiment of FIGS. 11 and 12 that the machine 10 will not require a drive roll 68 and related mechanisms due to the driving action of the platen 250.

Referring now to FIG. 13, another alternate embodiment of the thermal cartridge 210 is shown and is designated generally as 410. The cartridge 410 is designed to be a "thermal counterpart" of the plain paper cartridge 352. The cartridge 410 includes many of the features of the cartridge 210, those features being designated with the same reference characters as the cartridge 210. The cartridge 410 differs principally from the cartridge 210 in that the fixed paper guide 184a and the print platen 186a are replaced by a rotating platen 250a. The platen 250a is generally cylindrical and is generally as long as the width of the thermal paper 236. The platen 250a is rotatably disposed within the housing 212 so as to be driven by the motor 46 in a clockwise direction 258a through a similar gear arrangement as shown in FIG. 12. As was the case with the cartridge 210, the print head 94 projects through the access opening 154a to engage the platen 250a, with the thermal paper web 198 being disposed between the print head 94 and the platen 250a. The rotation of the platen 250a advances the thermal paper web 198 past the print head 94 during reception of a facsimile message. It will be appreciated that, as was the case in the embodiment of FIGS. 11 and 12, in the embodiment of FIG. 13 the machine 10 will not require a drive roll 68 and related mechanisms due to the driving action of the platen 250a.

In operation, the operator may select either the plain paper 52 or thermal paper cartridge 210 for installation in the machine 10. Any of the cartridges 52, 210, 310, 352, 410 are installed by placing the cartridge housing 130, 212 within the recess 42 so that the hook formation 150, 150a engages the pivot lugs 44, and the slot 66, 66a is engaged by the latch end 64. Whichever cartridge is used, the front end 134 of the cartridges 52, 352 or the front end flange 226 of the cartridges 210, 310, 410 abuts a stop bar 242 located on the machine 10 (best seen in FIGS. 3 and 3a). Upon installation and removal of either cartridge 52, 210, 352, 410, the wiping strip 158, 158a will wipingly engage and clean the print head 94. Also, the cartridges 52, 210, 352, 410 are disposed within the recess 42 so that the print head 94 and, for cartridges 52, 210 and 310, the drive roll 68 may project into the access opening 154, 154a.

If the plain paper cartridge 52 is selected and installed in the machine 10, the print head 94 presses the ribbon 196 and paper 164 against the platen 186, and the drive roll 68 likewise presses the ribbon and paper against the feed roll 190. When a message is received by the machine 10, a signal is transmitted to the motor 46, which drives the drive roll 68 and the ribbon take-up spool 200 to feed the paper 164 and the ribbon 196 simultaneously past the print head 94 and platen 186 for effective message transcription. The cartridge 352 operates in a similar fashion, with the driving force of the drive roll 68 being provided by the rotating platen 250.

If the thermal ribbon cartridge 210 is selected and installed, a similar operational procedure is followed, with the exception that the thermal paper 236 obviates the need for separate ribbon and paper, and the driven ribbon take-up spool 200 may be eliminated. Thus, the thermal paper 236 is located between the print head 94 and the platen 186a for message transcription. The cartridge 410 operates in a similar fashion, with the driving force of the drive roll 68 being provided by the rotating platen 250a.

Upon reception of a message on thermal paper 236, if the operator desires a plain paper copy, he merely changes the thermal paper cartridge 210 for the plain paper cartridge 52, inserts the facsimile message in the slot 37, and activates the interface circuit 126 to operate the machine 10 in a copier mode. Copies may also be made on thermal paper 236. When in the copier mode, the machine 10 can also generate copies of documents not originally produced as facsimiles.

When the ribbon 196 and/or the paper 164, 236 is spent, as may be indicated on the control panel 30 by a signal from the end-of-ribbon sensor 204, 204a, the operator merely presses the latch button 40 and removes the cartridge, while simultaneously cleaning the print head 94 by means of the wiping strip 158, 158a. To install a new cartridge 52, 210, 310, 352, 410, the hook formation 150, 150a is situated so as to engage the lugs 44, and the cartridge is lowered into the recess 42 until the latch end 64 engages the slot 66, 230. The present system also enables the operator to rapidly change the type of paper stored in the machine depending on the type of message received.

While a particular embodiment of the plain paper facsimile cartridge of the invention has been shown and described, it will be appreciated by those skilled in the art that changes and modifications may be made thereto without departing from the invention in its broader aspects and as set forth in the following claims.

What is claimed is:

1. A plain paper cartridge for a facsimile machine having a recess and a print head projectable into the recess, comprising:
   a cartridge housing configured for releasable disposition in the recess and having an access opening for accommodating the print head for operational engagement in said cartridge;
   a paper supply roll having a supply of plain paper adapted to be drawn from said roll as a web and being located within said cartridge housing;
   a ribbon supply roll provided with a supply of thermal transfer ribbon adapted to be drawn from said ribbon supply roll as a web and being located within said cartridge housing;
   a paper guide secured within said housing for receiving said webs of paper and ribbon; and
   said paper and ribbon supply rolls being disposed in said cartridge housing and said paper and ribbon webs are drawn across said paper guide so that the print head may transfer a facsimile message through the web of said ribbon upon a corresponding portion of said web of said paper.

2. The cartridge as defined in claim 1 further including print head cleaning means for cleaning said print head.

3. The cartridge as defined in claim 2 wherein said cleaning means is a wiping surface disposed on a lower portion of said cartridge housing.

4. The cartridge as defined in claim 3 wherein said wiping surface is a wiping strip disposed on said cartridge housing to wipingly contact the facsimile machine print head upon insertion into and removal of said cartridge from the facsimile machine.

5. The cartridge as defined in claim 4 wherein the facsimile machine further includes a drive roll pivotally mounted to the machine to project through said access opening in conjunction with said print head, and said cartridge further includes a feed roll disposed in said cartridge housing for contact with the drive roll as the drive roll projects through said access opening, said feed roll and the drive roll forming a nip through which said web of said paper passes for movement through said cartridge.

6. The cartridge as defined in claim 4 wherein said housing includes a hook formation at the top of a rear end thereof.

7. The cartridge as defined in claim 6 wherein said hook formation defines a pivot axis of said cartridge in the facsimile machine, and said wiping surface is located on said housing so as to be on a radius of said pivot axis.

8. The cartridge as defined in claim 1 wherein said paper is curled as a result of being rolled and said paper supply roll, said cartridge housing is provided with a paper outlet through which said web of said paper passes after receiving a facsimile message from the print head, and further including curl reversing means for reversing said curl before said paper web passes through said outlet.

9. The cartridge as defined in claim 8 wherein said curl reversing means includes a feed roll and said paper guide, said web of paper being looped about said paper guide and said feed roll to reverse said curl.

10. The cartridge as defined in claim 9 wherein said paper guide is provided with a print platen disposed to operationally engage the print head.

11. The cartridge as defined in claim 1 further including a platen disposed on a forward edge of said paper guide in said cartridge housing so that said webs of plain paper and said ribbon may be drawn across said platen for operational engagement with the facsimile machine print head as the print head projects through said access opening.

12. The cartridge as defined in claim 1 wherein the machine has drive means, said paper guide including a print platen being configured as a roller for operationally engaging the print head and for being rotatably driven by the drive means for driving said webs of paper and ribbon through said cartridge housing.

13. The cartridge as defined in claim 12 further including a ribbon take-up spool disposed in said cartridge housing to receive said ribbon from said ribbon supply roll.

14. The cartridge as defined in claim 13 wherein said ribbon take-up spool is driven by connection with said platen.

15. The cartridge as defined in claim 14 wherein said ribbon take-up spool is connected to said platen by a pulley and garter spring arrangement.

16. The cartridge as defined in claim 1 wherein said ribbon supply roll has a reflective trailer and the housing has an opening which accommodates an end-of-ribbon sensor for interaction with said reflective trailer.

17. The cartridge as defined in claim 1 wherein an upper surface of said housing is provided with a transverse tear bar.

18. The cartridge as defined in claim 1 further including means for preventing the rotation of the paper supply roll prior to the insertion of the cartridge in the machine.

19. The cartridge as defined in claim 18 wherein said means for preventing rotation includes an arm disposed on at least one side of said cartridge housing, said arm having a tab positioned to engage an end of said supply roll.

20. A plain paper cartridge for a facsimile machine having a housing with a recess in an upper end and a print head projectable into the recess and a drive roll configured to pivotally project into the recess, comprising:
a cartridge housing configured for releasable disposition in the recess and having an access opening in a lower end;
a paper supply roll having a supply of plain paper and being located within said cartridge housing;
a ribbon supply roll provided with a supply of thermal transfer ribbon and being located within said cartridge housing;
a ribbon take-up spool disposed in said cartridge housing to receive said ribbon from said ribbon supply roll;
a platen being secured in said cartridge housing between said ribbon supply roll and said ribbon take-up roll for operational engagement with the facsimile machine print head through webs of said paper and said ribbon as the print head projects through said access opening, so that a facsimile message may be transferred from said print head to said web of paper and;
a feed roll disposed within said housing to be engaged by the drive roll as the drive roll projects through said access opening for drawing said web of paper through said cartridge.

21. The cartridge as defined in claim 20 further including print head cleaning means for cleaning said print head.

22. The cartridge as defined in claim 21 wherein said print head cleaning means for cleaning said print head is a wiping strip disposed on a lower portion of said cartridge housing.

23. The cartridge as defined in claim 22 wherein said wiping strip is disposed on said cartridge housing to wipingly contact the facsimile machine print head upon insertion into and removal of said cartridge from the facsimile machine.

24. The cartridge as defined in claim 1 wherein the machine has drive means, said paper guide including a print platen being configured as a roller for operationally engaging the print head and for being rotatably driven by the drive means for driving said webs of paper and ribbon through said cartridge housing.

25. A plain paper cartridge for a facsimile machine having a recess and a print head projectable into the recess, comprising:
a cartridge housing configured for releasable disposition in the recess and having an access opening for accommodating the print head for operational engagement in said cartridge;
a paper supply roll having a supply of plain paper and being located within said cartridge housing; and
a ribbon supply roll provided with a supply of thermal transfer ribbon and being located within said cartridge housing;
said paper and ribbon supply rolls being disposed in said cartridge housing so that the print head may transfer a facsimile message through a web of said ribbon upon a corresponding web of said paper; and
said cartridge including print head cleaning means for cleaning said print head, said cleaning means having a wiping strip disposed on a lower portion of said cartridge housing to wipingly contact the facsimile machine print head upon insertion into and removal of said cartridge from the facsimile machine.

26. The cartridge as defined in claim 25 wherein said housing includes a hook formation at the top of a rear end thereof.

27. The cartridge as defined in claim 26 wherein said hook formation defines a pivot axis of said cartridge in the facsimile machine, and said wiping surface is located on said housing so as to be on a radius of said pivot axis.

28. A plain paper cartridge for a facsimile machine having a housing with a recess in an upper end and a print head projectable into the recess, comprising:

a cartridge housing configured for releasable disposition in the recess and having an access opening in a lower end;

a paper supply roll having a supply of plain paper and being located within said cartridge housing;

a ribbon supply roll provided with a supply of thermal transfer ribbon and being located within said cartridge housing;

a ribbon take-up spool disposed in said cartridge housing to receive said ribbon from said ribbon supply roll;

a platen being disposed in said housing between said ribbon supply roll and said ribbon take-up roll for operational engagement with the facsimile machine print head through a web of said paper and a web of said ribbon as the print head projects through said access opening, so that a facsimile message may be transferred from said print head to said web of paper; and print head cleaning means for cleaning said print head, said cleaning means including a wiping strip disposed on a lower portion of said cartridge housing.

29. The cartridge as defined in claim 28 wherein said wiping strip is disposed on said cartridge housing to wipingly contact the facsimile machine print head upon insertion into and removal of said cartridge from the facsimile machine.

30. A plain paper cartridge for a facsimile machine and cartridge system including a facsimile machine having a recess and a print head projectable into the recess, a plain paper cartridge and a thermal paper cartridge, both of said cartridges being interchangeably insertable into the recess, and each said cartridge having a housing with an access opening for operationally engaging the print head, said plain paper cartridge comprising:

a cartridge housing configured for releasable disposition in the recess and having an access opening for accommodating the print head for operational engagement in said cartridge;

a paper supply roll having a supply of plain paper adapted to be drawn from said roll as a web and being located within said cartridge housing;

a ribbon supply roll provided with a supply of thermal transfer ribbon adapted to be drawn from said roll as a web and being located within said cartridge housing;

a paper guide secured within said housing for receiving said webs of paper and ribbon; and said paper and ribbon supply rolls being disposed in said cartridge housing and said paper and ribbon webs are drawn against said paper guide so that the print head may transfer a facsimile message through said web of said ribbon upon a corresponding point on said web of paper.

31. The cartridge as defined in claim 30 wherein the facsimile machine further includes a drive roll configured to project through said access opening, and said cartridge further includes a feed roll disposed in said cartridge housing for contact with the drive roll as the drive roll projects through said access opening, said feed roll and said drive roll forming a nip through which said web of said paper passes for movement through said cartridge.

32. The cartridge as defined in claim 30 wherein the machine has drive means, said cartridge further including a print platen being configured for operationally engaging the print head and for being rotatably driven by the driven means for driving said webs of paper and ribbon through said cartridge housing.

33. The cartridge as defined in claim 30 further including means for cleaning the print head of the facsimile machine as said cartridge is inserted into and withdrawn from the machine.

34. The cartridge as defined in claim 33 wherein said means for cleaning includes a wiping strip disposed on said cartridge housing.

* * * * *